Figure 1:
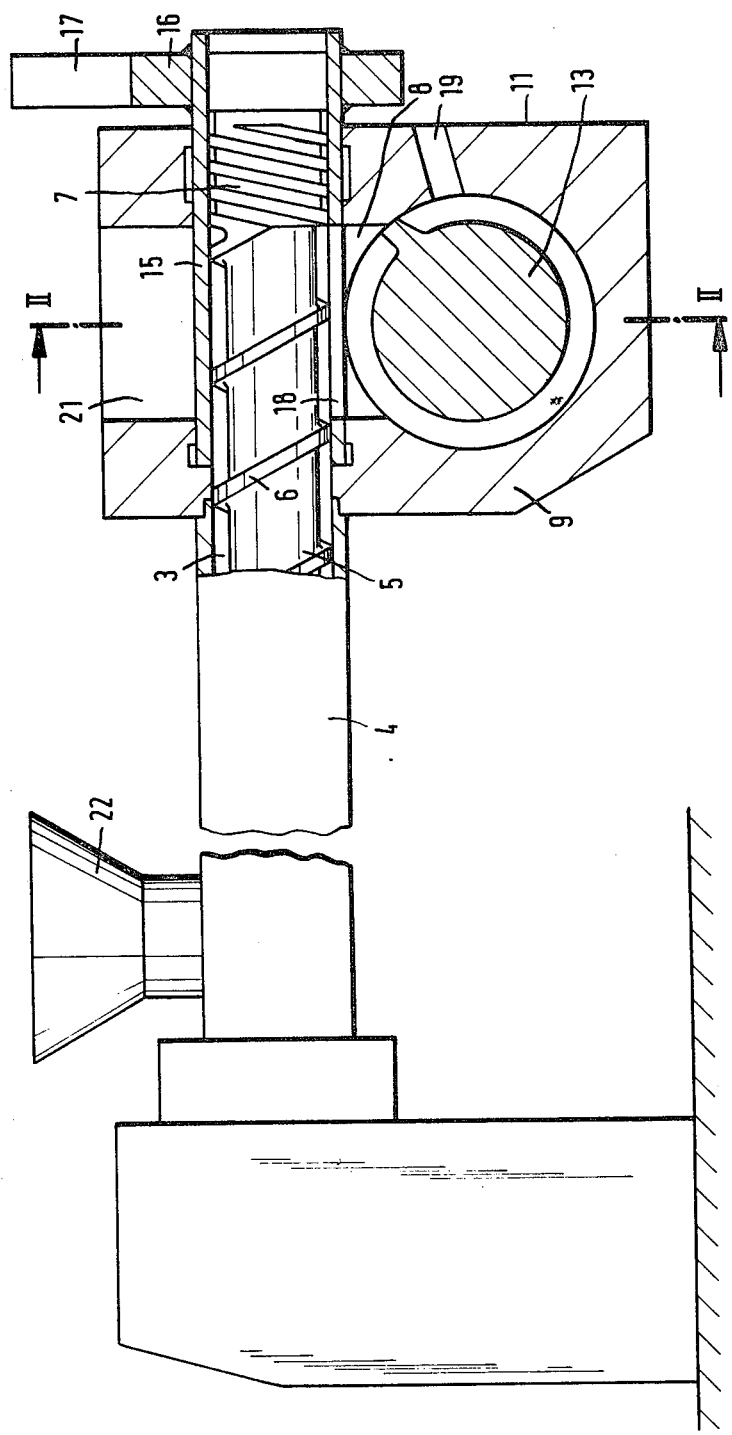

United States Patent [19]

Anders

[11] 4,332,480
[45] Jun. 1, 1982

[54] KNEADING AND MIXING MACHINE

[75] Inventor: Dietmar Anders, Hanover, Fed. Rep. of Germany

[73] Assignee: Hermann Berstorff Maschinenbau GmbH, Hannover Kleefeld, Fed. Rep. of Germany

[21] Appl. No.: 152,834

[22] Filed: May 23, 1980

[30] Foreign Application Priority Data

Jun. 8, 1979 [DE] Fed. Rep. of Germany ....... 2913219

[51] Int. Cl.³ .............................................. B28C 7/16
[52] U.S. Cl. ...................................... 366/77; 366/83; 366/91; 366/192
[58] Field of Search ..................... 366/69, 77, 79, 186, 366/187, 188, 192, 91, 194–196, 318, 83, 88, 321; 425/208, 207, 209; 222/240, 485

[56] References Cited

U.S. PATENT DOCUMENTS 1,486,328  3/1924  Fraser ................................. 366/77

3,700,247  10/1972  Butler et al. .......................... 366/88

*Primary Examiner*—Philip R. Coe
*Assistant Examiner*—Timothy F. Simone
*Attorney, Agent, or Firm*—Schwartz, Jeffery, Schwaab, Mack, Blumenthal & Koch

[57] ABSTRACT

A kneading and mixing machine for plastic materials having a housing with a rotor rotatable therein to convey material from an inlet aperture fed by a feed hopper to an outlet passage and to plasticise the material during such conveying, and a throttling member in the form of a cylindrical sleeve concentrically surrounding the rotor within the housing having an aperture therein and being rotatable to alter the extent of the alignment of the aperture with the passage and thus the size of the effective output aperture of the machine.

A discharge extruder may be fed via the aperture or the sleeve can be rotated to eject the output of the machine through a second outlet.

4 Claims, 2 Drawing Figures

KNEADING AND MIXING MACHINE

The invention relates to continuously operable kneading and mixing machines for plastics or rubber materials. Machines of this general kind have been previously proposed wherein shear energy is applied to the moulding material to be processed, by means of rotating kneading and mixing implements, so that the material is plasticised and admixtures are dispersed in it.

In practice with such machines it has been found desirable to be able to control the residence time of the moulding material in the machine. The mixing action and rise in temperature may be influenced by the time of residence and the pressure of the material. For this reason throttling means are known for varying the cross-section of an outlet aperture of the kneading and mixing machine. By constricting or widening the cross-section of the outlet aperture it is possible to control the amount of shear energy absorbed by the moulding material to be processed.

A large number of embodiments of such throttling means in the region of the outlet aperture have been proposed. However, all known throttling means have the disadvantage of being unduly expensive and/or not working satisfactorily.

In one kneading and mixing machine known from published German Specification No. 16 79 829, a pivotable transverse wall is arranged at the outlet aperture. This wall can be pivoted inwardly towards the outlet passage to a greater or less degree. The wall varies the size of the outlet passage in cross-section. The discharge of the plasticised moulding material encounters resistance, which depends substantially on the variable cross-section of the outlet passage.

In multi-stage screw extruders it is similarly known for throttling means to be provided in the outlet region of the first extruding stage and the inlet region of the second. It is an advantage to use these two-stage extruders in certain cases, because gentle treatment of the moulding material is possible with the extruders, which may for example be disposed in a cascade arrangement, since the screw shafts of the respective processing stage can be operated at different speeds. This independent setting of one extruding stage relative to another makes it possible to separate steps in the extrusion process.

A two-stage, continuously operating mixing and kneading machine, known from German Specification No. 11 31 389, has a rotary slide valve between the first and second processing stages; this valve varies the cross-section of a passage connecting the first stage to the second stage. The arrangement of such a valve takes up a large amount of space and is extremely prone to trouble.

In another two-stage extruder for plastic materials known from published German Specification No. 15 54 896, a vertical conveying screw has a conical shoulder at the end, and this shoulder interacts with a similarly conical part of the associated screw housing. This forms a throttling position, whereby the passage of the moulding material from the first processing stage to the second can be controlled by axial displacement of the vertical conveying screw. Such vertical displacement is technically expensive, since a drive with an axial action has to be provided for the screw, and this in turn involves providing a technically expensive mount for the screw.

The invention has among its objects to provide a kneading and mixing machine with a technically simple and easily assembled throttling means in the outlet region.

According to the invention, there is provided a continuously operable kneading and mixing machine for plastic materials, comprising a housing, a mixing rotor rotatable in the housing, an inlet aperture and an outlet aperture in the housing, by which mixing rotor material can be plasticised and conveyed from said inlet aperture to said outlet aperture, and a throttling member to vary the cross-section of the outlet aperture, said throttling member comprising a rotatable cylindrical sleeve concentrically surrounding the mixing rotor within the housing in the region of said outlet aperture and having a discharge orifice therein.

The rotatable cylindrical sleeve can be used to control the pressure in the kneading and mixing machine. The residence time of the moulding material can be varied by changing the cross-section of the outlet. Thus the discharge orifice of the sleeve can be brought more or less into greater or lesser registry with the outlet aperture of the kneading and mixing machine thereby to vary the outlet cross-section for the moulding material emerging from the machine. If the outlet cross-section is reduced by turning the cylindrical sleeve, then resistance to the outflow of the plasticised moulding material is increased. To overcome the increased resistance to outflow a higher material pressure is necessary, leading to a greater drag length within the machine and thus to a longer residence time and more shearing of the moulding material.

Advantageously the discharge orifice in the cylindrical sleeve can be brought into registry with a second outlet aperture in the housing of the kneading and mixing machine. The cylindrical sleeve controlling the working pressure in the kneading and mixing machine can thus also be used as a starting up valve. When the machine is being started up the discharge orifice of the cylindrical sleeve is brought into registry with the second outlet aperture of the machine. The moulding material conveyed passes through the second outlet aperture into, for example, a waste bin. When the moulding material emerging is sufficiently plasticised, the cylindrical sleeve is turned so that the discharge orifice therein is brought into registry with the outlet aperture of the machine. The moulding material now being discharged from the kneading and mixing machine is already sufficiently plasticised for it to be passed on to downstream processing means such as a discharge extruder.

The throttling means according to the invention may thus also be constructed as a starting valve. The throttling means proposed by the prior art do not have this advantageous combination of functions.

Figure 2:
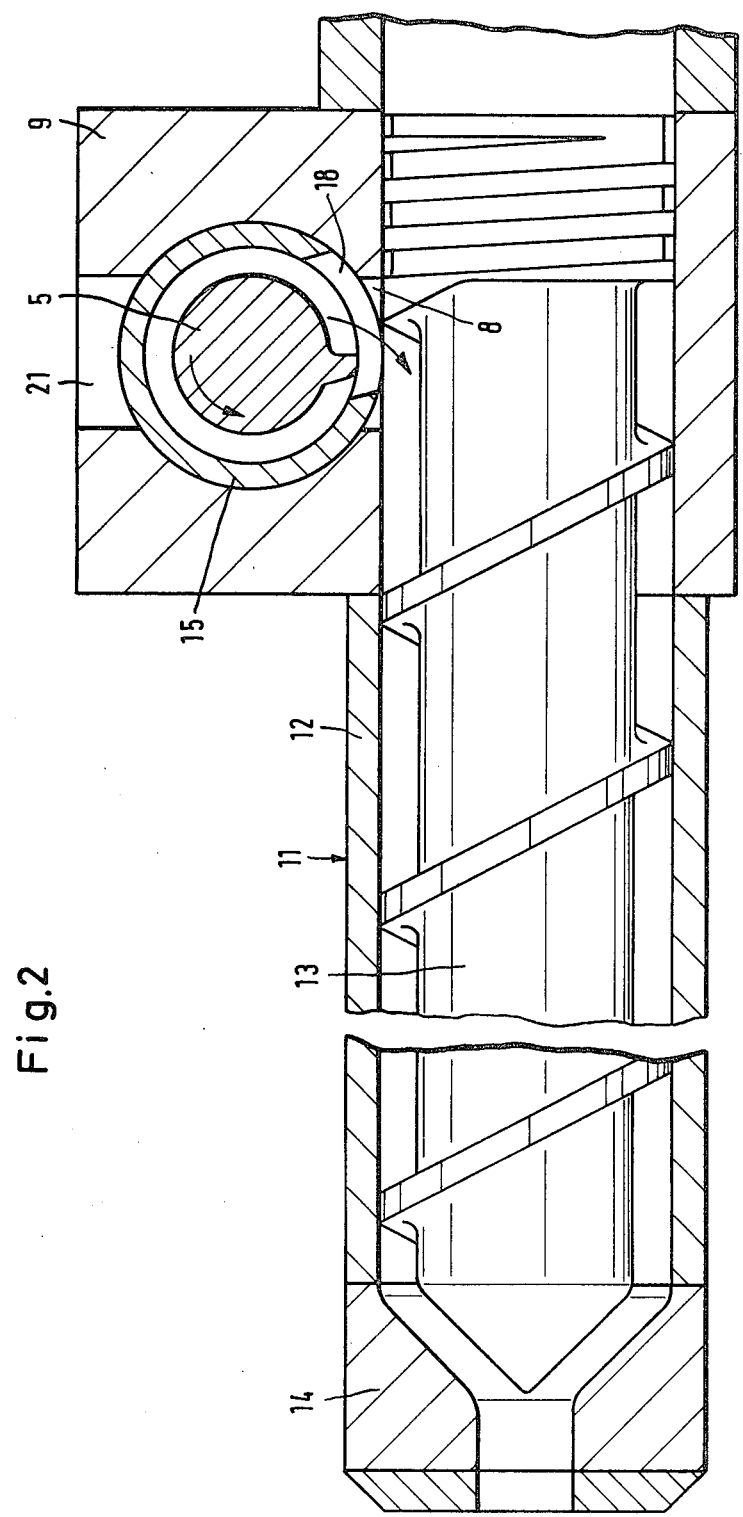

The invention is diagrammatically illustrated by way of example in the accompanying drawings, from which drawings for the sake of clarity equipment which is not necessary to an understanding of the invention has been omitted, and in which:

FIG. 1 shows a continuous operable kneading and mixing machine according to the invention with a discharge extruder arranged at right angles below it; and FIG. 2 is a section taken on line II—II of FIG. 1.

Referring to the drawings, a kneading and mixing machine comprises a housing 4 with a cylindrical recess 3 in which a mixing rotor 5 is mounted for rotation. The rotor 5 may be a bilaterally mounted shaft with screw members and kneading blades mounted on it in any desired sequence. At the opened-up outlet end of the kneading and mixing machine the rotor 5 has a screw conveyor portion 6, adjoined by a fine-pitched returning thread 7. The screw conveyor portion 6 covers a connecting passage 8 in a housing block 9, the passage 8 joining the outlet region of the kneading and mixing machine to the inlet region of a discharge extruder 11 arranged below the mixer. The axis of the extruder 11 is disposed at right angles to the axis of the kneading and mixing machine and has a rotatable discharge screw 13 in a housing cylinder 12. An output head 14 with an orifice therein is arranged at the end of the discharge extruder 11.

The bore 3 in the housing of the kneading and mixing machine is enlarged in the region of the connecting passage 8, and contains a rotatable cylindrical sleeve 15 the internal diameter of which corresponds to that of the remainder of the housing 4. The end of the sleeve 15 projecting from the housing 4 has an annular extension 16 welded onto it. This has a lever arm 17 for turning the sleeve 15. The sleeve 15 contains an opening which forms a discharge aperture 18. The moulding material pre-plasticised by the kneading and mixing machine can pass through the aperture 18 into the connecting passage 8 and thus into the discharge extruder 11. In the region of the junction of the two operating stages 5 and 11 the housing 12 of the extruder 11 contains a venting orifice 19, communicating either with the atmosphere or with a source of low pressure.

Opposite to the connecting passage 8 which forms the outlet aperture of the kneading and mixing machine, a second outlet 21 into the open air is provided in the housing block 9 of the machine. In the position of the cylindrical sleeve illustrated in the drawing, the second outlet 21 is closed by the cylindrical sleeve 15 since the aperture 18 in the sleeve 15 is aligned with the connecting passage 8.

The extruder described above operates as follows:

The moulding material to be processed, e.g. thermoplastic synthetic material, is placed in a feed hopper 22. The mixing rotor 5 is equipped with conveying, kneading and mixing members and conveys and plasticises the material. The pre-plasticised moulding material passes through the discharge orifice 18 of the cylindrical sleeve 15 and the connecting passage 8 into the discharge extruder 11, by which it can be gently conveyed further and extruded.

If examination of the extruded product indicates that the shearing energy applied needs to be increased, the cylindrical sleeve 15 is turned by pivoting the lever arm 17, so that more of the passage 8 is obstructed by the sleeve 15. The outlet cross-section available for the material leaving the kneading and mixing machine is thereby reduced. This results in an increase in pressure and an increase in the residence time of the moulding material in the machine.

When the machine is being started up, the outlet orifice 18 of the cylindrical sleeve 15 is brought into registry with the second outlet 21 by rotating the sleeve 15. The moulding material conveyed passes through the outlet 21 into the open air. Only when the material which is emerging is sufficiently plasticised is the orifice 18 in the sleeve 15 brought back into registry with the passage 8 in the machine. The second outlet 21 of the sleeve 15 is thereby simultaneously closed.

What is claimed is:

1. A continuously operable kneading and mixing machine for thermoplastic synthetic materials, comprising:
(a) housing means formed with an inlet for the material and an outlet aperture for discharging plasticized material from the housing;
(b) a mixing rotor rotatable in said housing means, said rotor including a screw conveying portion which extends over and thus covers said outlet aperture;
(c) a throttling member in the form of a cylindrical sleeve mounted in said housing means adjacent the outlet end thereof and adapted to be selectively independently rotated relative to said rotor, said cylindrical sleeve extending closely but rotatably around at least the region of said screw conveying portion of said rotor which covers said outlet aperture, wherein the internal diameter of said cylindrical sleeve is the same as the internal diameter of said housing means surrounding said rotor thereby providing a continuous surface closely around said rotor for effecting the desired plasticizing of said material, said cylindrical sleeve being formed with a circumferentially limiting discharge orifice adapted to be longitudinally aligned with said outlet aperture, and
(d) means for rotating said cylindrical sleeve so as to selectively align, partially align or disalign said discharge orifice with said outlet aperture, whereby the plasticized material can respectively freely pass through said outlet aperture, pass with restriction through said outlet aperture thereby increasing the retention time of and consequently the shear energy applied to the material, or be blocked altogether from passage through said outlet aperture.

2. A continuously operable kneading and mixing machine as claimed in claim 1, wherein said housing means is formed with a second outlet aperture generally opposite said first outlet aperture, whereby said discharge orifice of said cylindrical sleeve can be brought into registry with said second outlet aperture for discharging material therethrough and simultaneously closing off said outlet aperture.

3. A continuously operable kneading and mixing machine as claimed in claim 1 or 2, wherein said housing means comprises a cylinder and a housing block mounted on said cylinder at the outlet end thereof, said cylindrical sleeve being mounted for rotation in said housing block, said outlet aperture and said second outlet aperture being formed in said housing block.

4. A continuously operable kneading and mixing machine as claimed in claim 1 or 2, wherein said rotor is formed with a returning thread portion at the outer end thereof and beyond said outlet aperture.

* * * * *